United States Patent
Murayama

(10) Patent No.: US 7,520,170 B2
(45) Date of Patent: Apr. 21, 2009

(54) OUTPUT CORRECTION CIRCUIT FOR THREE-AXIS ACCELEROMETER

(75) Inventor: Katashi Murayama, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 43 days.

(21) Appl. No.: 11/775,853

(22) Filed: Jul. 10, 2007

(65) Prior Publication Data

US 2009/0013754 A1  Jan. 15, 2009

(51) Int. Cl.
*G01P 3/00* (2006.01)
*G01P 15/00* (2006.01)

(52) U.S. Cl. ............................ 73/510; 73/495; 73/497

(58) Field of Classification Search ................ 73/510, 73/511, 493, 495, 1.38, 497
See application file for complete search history.

(56) References Cited

U.S. PATENT DOCUMENTS

| | | | |
|---|---|---|---|
| 4,914,598 A * | 4/1990 | Krogmann et al. | ............. 701/11 |
| 5,295,386 A * | 3/1994 | Okada | ........................ 73/1.07 |
| 5,492,020 A | 2/1996 | Okada | |
| 5,497,668 A | 3/1996 | Okada | |
| 5,531,092 A | 7/1996 | Okada | |
| 5,686,665 A * | 11/1997 | Hara et al. | ..................... 73/495 |
| 5,744,718 A | 4/1998 | Okada | |
| 6,023,664 A * | 2/2000 | Bennet | ........................ 702/141 |
| 6,053,057 A | 4/2000 | Okada | |
| 6,185,814 B1 | 2/2001 | Okada | |
| 6,314,823 B1 | 11/2001 | Okada | |
| 6,474,133 B1 | 11/2002 | Okada | |
| 6,512,364 B1 | 1/2003 | Okada | |
| 6,864,677 B1 | 3/2005 | Okada | |
| 6,894,482 B2 | 5/2005 | Okada | |
| 7,398,688 B2 * | 7/2008 | Zdeblick et al. | ............... 73/700 |
| 2004/0189340 A1 | 9/2004 | Okada | |
| 2005/0199434 A1 | 9/2005 | Okada | |

FOREIGN PATENT DOCUMENTS

JP          2006078310 A         3/2006

* cited by examiner

*Primary Examiner*—Helen C. Kwok
(74) *Attorney, Agent, or Firm*—Charles Bergere

(57) ABSTRACT

A sensor unit for a three-axis accelerometer enabling reduction in chip size. The sensor unit is connected to an accelerometer that detects a plurality of acceleration values for a plurality of axis directions. The sensor unit includes a correction value generation circuit that sequentially generates a plurality of correction values for correcting the plurality of acceleration values. A correction circuit is connected to the correction value generation circuit to sequentially correct the plurality of acceleration values with a plurality of correction values and generate a plurality of corrected acceleration values.

8 Claims, 12 Drawing Sheets

OUTPUT CORRECTION CIRCUIT FOR THREE-AXIS ACCELEROMETER

BACKGROUND OF THE INVENTION

The present invention relates to a three-axis accelerometer, and more particularly, to a circuit for correcting acceleration values for X-axis, Y-axis, and Z-axis directions detected by a three-axis accelerometer.

FIG. 1A is a schematic circuit diagram of a conventional sensor unit 100 for correcting the output of a three-axis accelerometer 1. The three-axis accelerometer 1 is a capacitive type accelerometer employing MEMS (Micro Electron Mechanical Systems) technology. The three-axis accelerometer 1 detects a plurality of acceleration values as capacitance values for orthogonal axes, that is, the X-axis, Y-axis, and Z-axis directions.

The sensor unit 100 includes a capacitance-voltage (C-V) conversion circuit 110, temperature coefficient of offset (TCO) circuits 121 to 123, and operational amplifiers 131 to 133. The C-V conversion circuit 110 is connected to the three-axis accelerometer 1. The operational amplifiers 131 to 133 are connected to the TCO circuits 121 to 123, respectively. The C-V conversion circuit 110 receives an acceleration detection signal (capacitance value) from the accelerometer 1 and converts the capacitance value to a voltage value to generate an input signal Vin, which is shown in FIG. 1B.

The TCO circuits 121 to 123 generate temperature coefficient values TCx, TCy, and TCz for correcting the temperature dependency of the three-axis accelerometer 1, that is, the temperature dependency of acceleration values Ax, Ay, and Az for the X-axis, Y-axis, and Z-axis directions that are detected by the accelerometer 1. The three TCO circuits 121 to 123 have the same structure. Thus, the structure of only the TCO circuit 121 is described below.

The TCO circuit 121 receives a trimming signal Tx for setting the temperature coefficient value TCx. The TCO circuit 121 includes a decoder for receiving the trimming signal Tx and a register for storing the temperature coefficient value TCx. The TCO circuit 121 decodes the trimming signal Tx with the decoder and reads the temperature coefficient value TCx from the register based on the decoding result. The temperature coefficient value TCx read from the TCO circuit 121 is provided to the operational amplifier 131 as a reference voltage. In the same manner, the TCO circuit 122 decodes a trimming signal Ty, reads the temperature coefficient value TCy, and provides the temperature coefficient value TCy to the operational amplifier 132. Similarly, the TCO circuit 123 decodes a trimming signal Tz, reads the temperature coefficient value TCz, and provides the temperature coefficient value TCz to the operational amplifier 133.

The operational amplifiers 131 to 133 each have a first input terminal, a second input terminal, and an output terminal. An input capacitor 141 for holding the input signal Vin is connected between the first input terminal of each of the operational amplifiers 131 to 133 and the C-V conversion circuit 110. The second input terminal of the operational amplifier 131 is provided with the temperature coefficient value TCx generated by the TCO circuit 121. The second input terminal of the operational amplifier 132 is provided with the temperature coefficient value TCy generated by the TCO circuit 122. The second input terminal of the operational amplifier 133 is provided with the temperature coefficient value TCz generated by the TCO circuit 123. A feedback capacitor 151 is connected between the first input terminal and the output terminal of the operational amplifier 131. A feedback capacitor 152 is connected between the first input terminal and the output terminal of the operational amplifier 132. A feedback capacitor 153 is connected between the first input terminal and the output terminal of the operational amplifier 133.

The operational amplifier 131 calculates the difference between the input signal Vin (acceleration value Ax) and the temperature coefficient value TCx (reference voltage). Then, the operational amplifier 131 amplifies the difference to generate an acceleration signal Xout. More specifically, the operational amplifier 131 corrects the acceleration value Ax with the temperature coefficient value TCx to generate the acceleration signal Xout for the X-axis direction. In the same manner, the operational amplifier 132 corrects the acceleration value Ay with the temperature coefficient value TCy to generate an acceleration signal Yout for the Y-axis direction. The operational amplifier 133 corrects the acceleration value Az with the temperature coefficient value TCz to generate an acceleration signal Zout for the Z-axis direction.

As described above, the conventional sensor unit 100 corrects the acceleration values for the X-axis, Y-axis, and Z-axis directions with the corresponding temperature coefficient values TCx, TCy, and TCz provided separately from the three TCO circuits 121 to 123 to compensate for the offset temperature characteristics of the accelerometer 1.

The conventional sensor unit 100 needs the three TCO circuits 121 to 123 to separately obtain the temperature coefficient values TCx, TCy, and TCz. As described above, the TCO circuits 121 to 123 each include a decoder and a register. Thus, each TCO circuit occupies a relatively large circuit area. As a result, the three TCO circuits 121 to 123 occupy an extremely large circuit area provided on the chip of the sensor unit 100. This increases the chip size of an ASIC (application-specific integrated circuit) on which the sensor unit 100 is mounted and ultimately increases the chip cost.

Recent accelerometers are required to be fabricated at a lower cost. One way to lower the cost is to reduce the chip size of the sensor unit. Thus, it would be advantageous to have a smaller sensor unit.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The present invention provides a sensor unit for a three-axis accelerometer that has a reduced chip size. One aspect of the present invention is a sensor unit for connection to an accelerometer in which the accelerometer detects a plurality of acceleration values for a plurality of axis directions. The sensor unit includes a correction value generation circuit that sequentially generates a plurality of correction values for respectively correcting the plurality of acceleration values. A correction circuit is connected to the correction value generation circuit. The correction circuit receives the plurality of correction values from the correction value generation circuit and sequentially corrects the plurality of acceleration values with the plurality of correction values to generate a plurality of corrected acceleration values.

Other aspects and advantages of the present invention will become apparent from the following description, taken in conjunction with the accompanying drawings, illustrating by way of example the principles of the invention.

A sensor unit 10 according to an embodiment of the present invention will now be described with reference to the drawings.

Figure 1A:
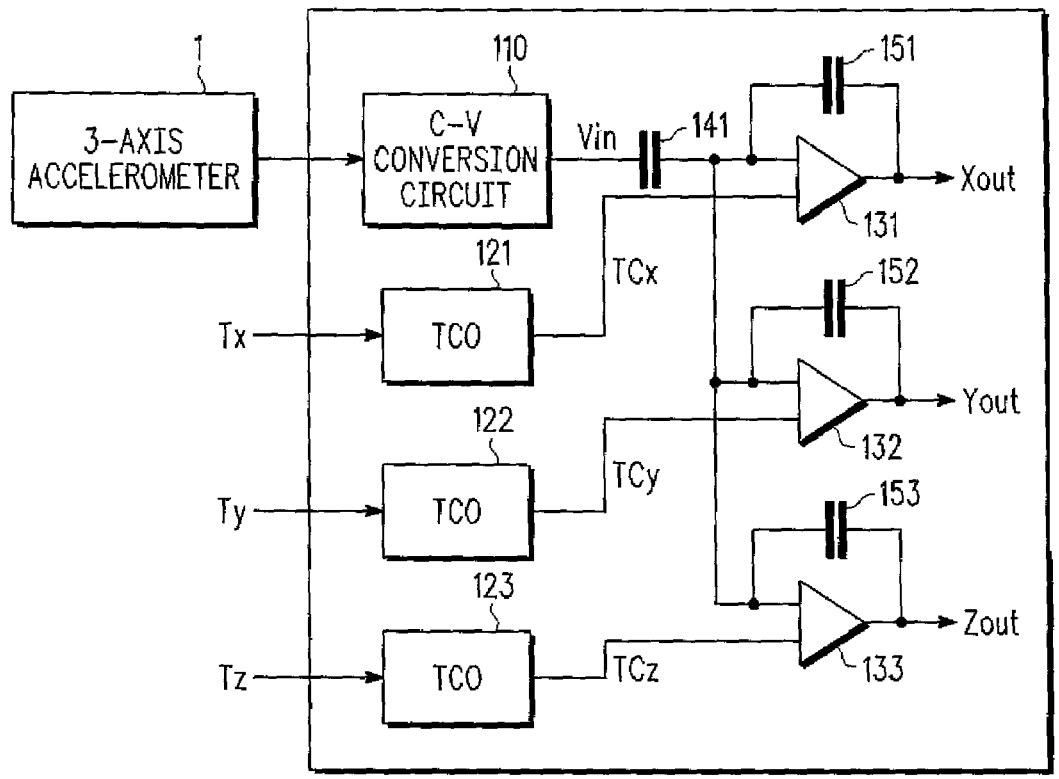
FIG. 1A is a schematic circuit diagram of a conventional sensor unit connected to a three-axis accelerometer.
Figure 1B:
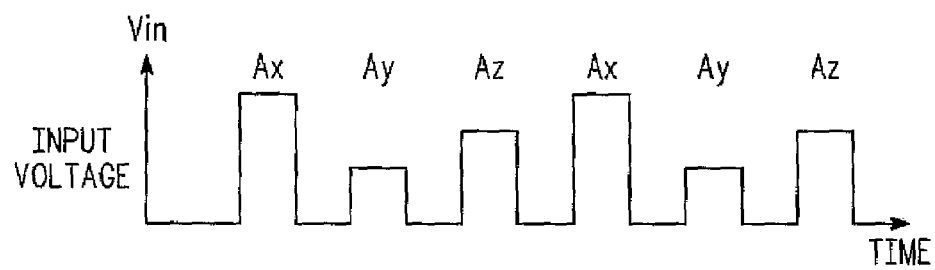
FIG. 1B is a waveform diagram of an input signal (acceleration values for X-axis, Y-axis, and Z-axis directions) generated by a C-V conversion circuit shown in FIG. 1A.
Figure 2:
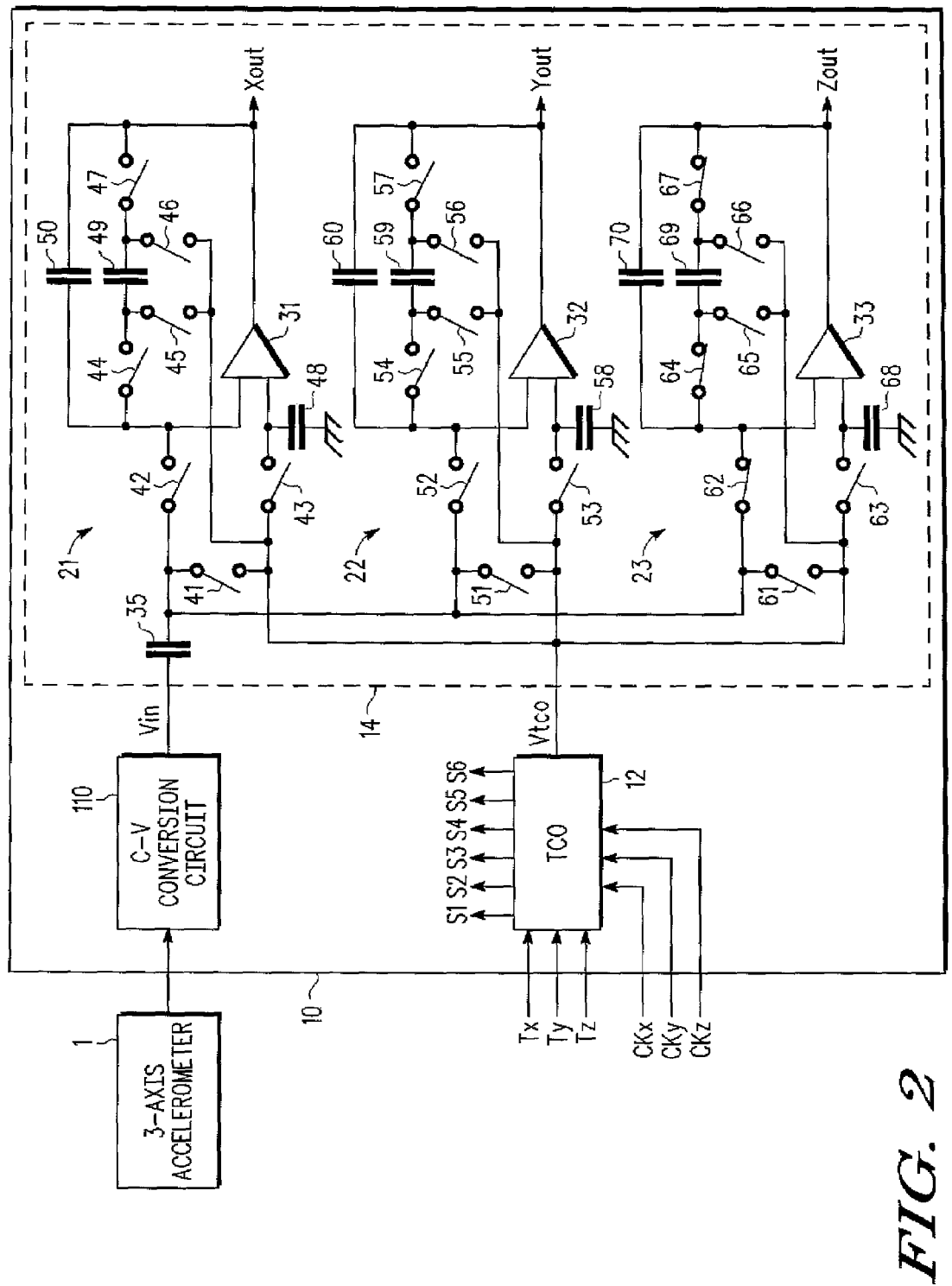
FIG. 2 is a schematic circuit diagram of a sensor unit connected to a three-axis accelerometer according to an embodiment of the present invention.

FIG. 2 is a schematic circuit diagram of the sensor unit 10. Like or same reference numerals are given to components that are the same or similar to those shown in FIG. 1. The sensor unit 10 of the preferred embodiment is connected to a three-axis accelerometer 1. The three-axis accelerometer 1 detects acceleration values Ax, Ay, and Az for X-axis, Y-axis, and Z-axis directions as capacitance values.

The sensor unit 10 includes a capacitance-voltage (C-V) conversion circuit 110, a temperature coefficient of offset (TCO) circuit 12, and an output circuit (correction circuit) 14. The output circuit 14 is connected to the C-V conversion circuit 110 and the TCO circuit 12. The C-V conversion circuit 110 receives a detection-indication of acceleration (capacitance value) from the three-axis accelerometer 1 and converts the capacitance value to a voltage value to generate an input signal vin (refer to FIG. 1B).

The TCO circuit 12 receives trimming signals Tx, Ty, and Ty and clock signals CKx, CKy, and CKz to generate a correction signal Vtco for correcting the temperature characteristic of the three-axis accelerometer 1. In the preferred embodiment, the TCO circuit 12 sequentially generates temperature coefficient values (correction values) TCx, TCy, and TCz (refer to FIG. 4) by changing the voltage level of the correction signal Vtco. The temperature coefficient values TCx, TCy, and TCz are used to separately correct the acceleration values Ax, Ay, and Az.

The output circuit 14 includes first to third switched capacitor (SC) circuits 21 to 23 and first to third operational amplifiers (amplifier circuits) 31 to 33. The first to third operational amplifiers 31 to 33 perform output processing in cooperation with the first to third SC circuits 21 to 23. The first to third operational amplifiers 31 to 33 have the same structure. Further, the first to third SC circuits 21 to 23 have the same structure. Thus, only the structure of the first SC circuit 21, the first operational amplifier 31, and the connection between the first SC circuit 21 and the first operational amplifier 31 will be described.

The first SC circuit 21 includes switches 41 to 47, an input capacitor 48, and a feedback capacitor 49. The switch 41 has a first terminal connected to an output terminal of the TCO circuit 12 and a second terminal connected to a first electrode of an input capacitor 35. A second electrode of the input capacitor 35 is connected to an output terminal of the C-V conversion circuit 110. The switch 42 has a first terminal connected to a second terminal of the switch 41 and a second terminal connected to a first input terminal of the first operational amplifier 31. The switch 4.3 has a first terminal connected to the first terminal of the switch 41 and a second terminal connected to a second input terminal of the first operational amplifier 31 and a first electrode of the input capacitor 48. A second electrode of the input capacitor 48 is connected to ground. The switch 44 has a first terminal connected to a second terminal of the switch 42 and a second terminal connected to a first electrode of the feedback capacitor 49. The switch 45 has a first terminal connected to the second terminal of the switch 44 and a second terminal connected to the first terminal of the switch 41 (i.e., the TCO circuit 12). The switch 46 has a first terminal connected to a second electrode of the feedback capacitor 49 and a second terminal connected to the second terminal of the switch 45 (i.e., the TCO circuit 12). The switch 47 has a first terminal connected to the first terminal of the switch 46 and a second terminal connected to an output terminal of the first operational amplifier 31. A feedback capacitor 50 is connected between the first input terminal and the output terminal of the first operational amplifier 31.

The switches 41, 43, 45, and 46 are turned on based on a first pulse φ1 provided as a reset signal s1 from the TCO circuit 12. The switches 42, 44, and 47 are turned on based on a second pulse φ2 provided as a sampling signal s2 from the TCO circuit 12. The first and second pulses φ1 and φ2 are generated to have different phases. In detail, the second pulse φ2 rises a few nanoseconds after the first pulse φ1 falls (refer to FIG. 14). The second pulse φ2 has a greater pulse width than the first pulse φ1.

During the period of a first reset phase RP1, the switches 41, 43, 45, and 46 are turned on based on the first pulse φ1. During this period, the switches 42, 44, and 47 are off. The input signal Vin having a voltage level corresponding to the acceleration value Ax for the X-axis direction (refer to FIG. 1B) is applied to the second electrode of the input capacitor 35 connected to the C-V conversion circuit 110. Further, the TCO circuit 12 generates the correction signal Vtco having a voltage level corresponding to the temperature coefficient value TCx and holds the voltage (TCx) throughout the first reset phase RP1 (refer to FIG. 4). As a result, voltage corresponding to the temperature coefficient value TCx is applied to the first electrode of the input capacitor 35, the first electrode of the input capacitor 48, and the first and second electrodes of the feedback capacitor 49. Accordingly, the input capacitor 35 accumulates charge corresponding to the acceleration value Ax, and the input capacitor 48 accumulates charge corresponding to the temperature coefficient value TCx. The potential between the first and second electrodes of the feedback capacitor 49 is reset by the correction signal Vtco.

Figure 4:
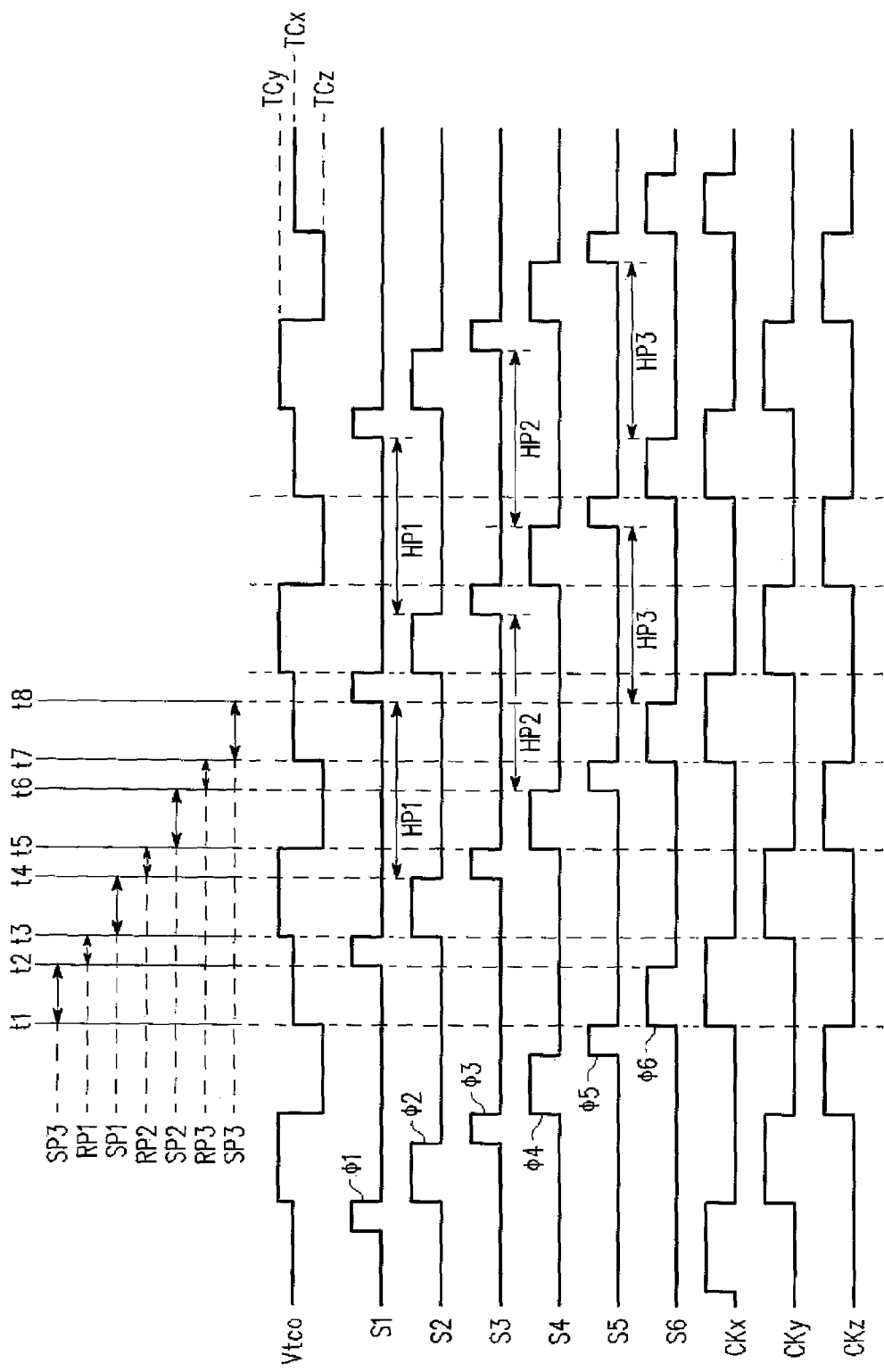
FIG. 4 is a waveform diagram of the signals of the sensor unit of FIG. 2.

During the period of a first sample phase SP1 the switches 42, 44, and 47 are turned on based on the second pulse φ2. During this period, the switches 41, 43, 45, and 46 are off. As shown in FIG. 4, the first sample phase SP1 follows the first reset phase RP1. During the period of the first sample phase SP1, voltage corresponding to the acceleration value Ax is applied to the first input terminal of the operational amplifier 31 based on the charge accumulated in the input capacitor 35. Voltage corresponding to the temperature coefficient value TCx is applied to the second input terminal of the first operational amplifier 31 based on the charge accumulated in the input capacitor 48. Further, the feedback capacitors 49 and 50 are connected in parallel between the first input terminal and the output terminal of the first operational amplifier 31. The first operational amplifier 31 calculates the difference between the acceleration value Ax (input voltage) provided to its first input terminal and the temperature coefficient value TCx (reference voltage) provided to its second input terminal. Then, the first operational amplifier 31 amplifies the difference to generate an acceleration signal Xout for the X-axis direction (corrected acceleration value). In other words, the first operational amplifier 31 corrects the acceleration value Ax for the X-axis direction with the temperature coefficient value TCx.

During the period of a first hold phase HP1, the switches 41 to 47 are all turned off. The first hold phase HP1 follows the first sample phase SP1. The first operational amplifier 31 holds the acceleration signal Xout throughout the first hold phase HP1. In this way, the first operational amplifier 31 cooperates with the first SC circuit 21 to repeat the output cycle of the first reset phase RP1, the first sample phase SP1, and the first hold phase HP1 and correct the acceleration value Ax for the X-axis direction.

The second SC circuit 22 includes switches 51 to 57, an input capacitor 58, and a feedback capacitor 59. The connection between the second operational amplifier 32 and the second SC circuit 22 is identical to the connection between the first operational amplifier 31 and the first SC circuit 21 and thus will not be described in detail.

The switches 51, 53, 55, and 56 are turned on based on a third pulse φ3 provided as a reset signal s3 from the TCO circuit 12. The switches 52, 54, and 57 are turned on based on a fourth pulse φ4 provided as a sampling signal s4 from the TCO circuit 12. The third and fourth pulses φ3 and φ4 are generated to have different phases. In detail, the fourth pulse φ4 rises a few nanoseconds after the third pulse signal φ3 falls. The fourth pulse φ4 has a greater pulse width than the third pulse φ3.

During the period of a second reset phase RP2, the switches 51, 53, 55, and 56 are turned on based on the third pulse φ3. During this period, the switches 52, 54, and 57 are off. As shown in FIG. 4, the second reset phase RP2 follows the first sample phase SP1 and overlaps the first hold phase HP1. During the period of the second reset phase RP2, the input signal Vin having a voltage level corresponding to the acceleration value Ay for the Y-axis direction (refer to FIG. 1B) is applied to the second electrode of the input capacitor 35 connected to the C-V conversion circuit 110. The TCO circuit 12 generates the correction signal Vtco having a voltage level corresponding to the temperature coefficient value TCy and holds the voltage (TCy) throughout the second reset phase RP2 (refer to FIG. 4). As a result, voltage corresponding to the temperature coefficient value TCy is applied to the first electrode of the input capacitor 35, a first electrode of the input capacitor 58, and first and second electrodes of the feedback capacitor 59. Accordingly, the input capacitor 35 accumulates charge corresponding to the acceleration value Ay, and the input capacitor 58 accumulates charge corresponding to the temperature coefficient value TCy. Further, the potential between the first and second electrodes of the feedback capacitor 59 is reset by the correction signal Vtco.

During the period of a second sample phase SP2, the switches 52, 54, and 57 are turned on based on the fourth pulse φ4. During this period, the switches 51, 53, 55, and 56 are off. As shown in FIG. 4, the second sample phase SP2 follows the second reset phase RP2. During the period of the second sample phase SP2, voltage corresponding to the acceleration value Ay is applied to a first input terminal of the second operational amplifier 32 based on the charge accumulated in the input capacitor 35. Further, voltage corresponding to the temperature coefficient value TCy is applied to a second input terminal of the second operational amplifier 32 based on the charge accumulated in the input capacitor 58. The feedback capacitors 59 and 60 are connected in parallel between the first input terminal and the output terminal of the second operational amplifier 32. The second operational amplifier 32 calculates the difference between the acceleration value Ay (input voltage) provided to its first input terminal and the temperature coefficient value TCy (reference voltage) provided to its second input terminal. Then, the second operational amplifier 32 amplifies the difference to generate an acceleration signal Yout for the Y-axis direction (corrected acceleration value). In other words, the second operational amplifier 32 corrects the acceleration value Ay for the Y-axis direction with the temperature coefficient value TCy.

During the period of a second hold phase HP2, the switches 51 to 57 are all turned off. The second hold phase HP2 follows the second sample phase SP2. The second operational amplifier 32 holds the acceleration signal Yout throughout the second hold phase HP2. In this way, the second operational amplifier 32 cooperates with the second SC circuit 22 to repeat the output cycle of the second reset phase RP2, the second sample phase SP2, and the second hold phase HP2 and correct the acceleration value Ay for the Y-axis direction.

The third SC circuit 23 includes switches 61 to 67, an input capacitor 68, and a feedback capacitor 69. The connection between the third operational amplifier 33 and the third SC circuit 23 is identical to the connection between the first operational amplifier 31 and the first SC circuit 21 and thus will not be described in detail.

The switches 61, 63, 65, and 66 are turned on based on a fifth pulse φ5 provided as a reset signal s5 from the TCO circuit 12. The switches 62, 64, and 67 are turned on based on a sixth pulse φ6 provided as a sampling signal s6 from the TCO circuit 12. The fifth and sixth pulses φ5 and φ6 are generated to have different phases. In detail, the sixth pulse φ6 rises a few nanoseconds after the fifth pulse signal φ5 falls. The sixth pulse φ6 has a greater pulse width than the fifth pulse φ5.

During the period of a third reset phase RP3, the switches 61, 63, 65, and 66 are turned on based on the fifth pulse φ5. During this period, the switches 62, 64, and 67 are off. As shown in FIG. 4, the third reset phase RP3 follows the second sample phase SP2 and overlaps the first and second hold phases HP1 and H22. During the third reset phase RP3, the input signal Vin having a voltage level corresponding to the acceleration value Az for the Z-axis direction (refer to FIG. 1B) is applied to the second electrode of the input capacitor 35 connected to the C-V conversion circuit 110. The TCO circuit 12 generates the correction signal Vtco having a voltage level corresponding to the temperature coefficient value TCz and holds the voltage (TCz) throughout the third reset phase RP3 (refer to FIG. 4). As a result, voltage corresponding to the temperature coefficient value TCz is applied to the first electrode of the input capacitor 35, a first electrode of the input capacitor 68, and first and second electrodes of the feedback capacitor 69. Accordingly, the input capacitor 35 accumulates charge corresponding to the acceleration value Az, and the input capacitor 68 accumulates charge corresponding to the temperature coefficient value TCz. Further, the potential between the first and second electrodes of the feedback capacitor 69 is reset by the correction signal Vtco.

During the period of a third sample phase SP3, the switches 62, 64, and 67 are turned on based on the sixth pulse φ6. During this period, the switches 61, 63, 65, and 66 are off. As shown in FIG. 4, the third sample phase SP3 follows the third reset phase period PR3. During the period of the third sample phase SP3, voltage corresponding to the acceleration value Az is applied to a first input terminal of the third operational amplifier 33 based on the charge accumulated in the input capacitor 35. Further, voltage corresponding to the temperature coefficient value TCz is applied to a second input terminal of the third operational amplifier 33 based on the charge accumulated in the input capacitor 68. The feedback capacitors 69 and 70 are connected in parallel between the first input terminal and the output terminal of the third operational amplifier 33. The third operational amplifier 33 calculates the difference between the acceleration value Az (input voltage) provided to its first input terminal and the temperature coefficient value TCz (reference voltage) provided to its second input terminal. Then, the third operational amplifier 33 amplifies the difference to generate an acceleration signal Zout for the Z-axis direction (corrected acceleration value). In other words, the third operational amplifier 33 corrects the acceleration value Az for the Z-axis direction with the temperature coefficient value TCz.

During the period of a third hold phase HP3, the switches 61 to 67 are all turned off. The third hold phase HP3 follows the third sample phase SP3. The third operational amplifier 33 holds the acceleration signal Zout throughout the third hold phase HP3. In this way, the third operational amplifier 33 cooperates with the third SC circuit 23 to repeat the output cycle of the third reset phase RP3, the third sample phase SP3, and the third hold phase HP3 and correct the acceleration value Az for the Z-axis direction.

Figure 3A:
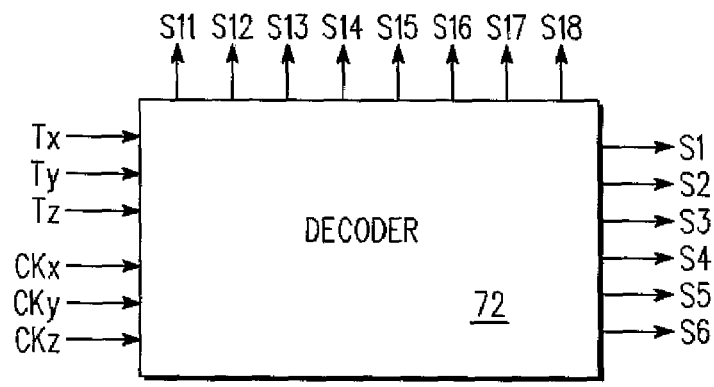
FIG. 3A is a block diagram of a decoder of a TCO circuit incorporated in the sensor unit of FIG. 2.
Figure 3B:
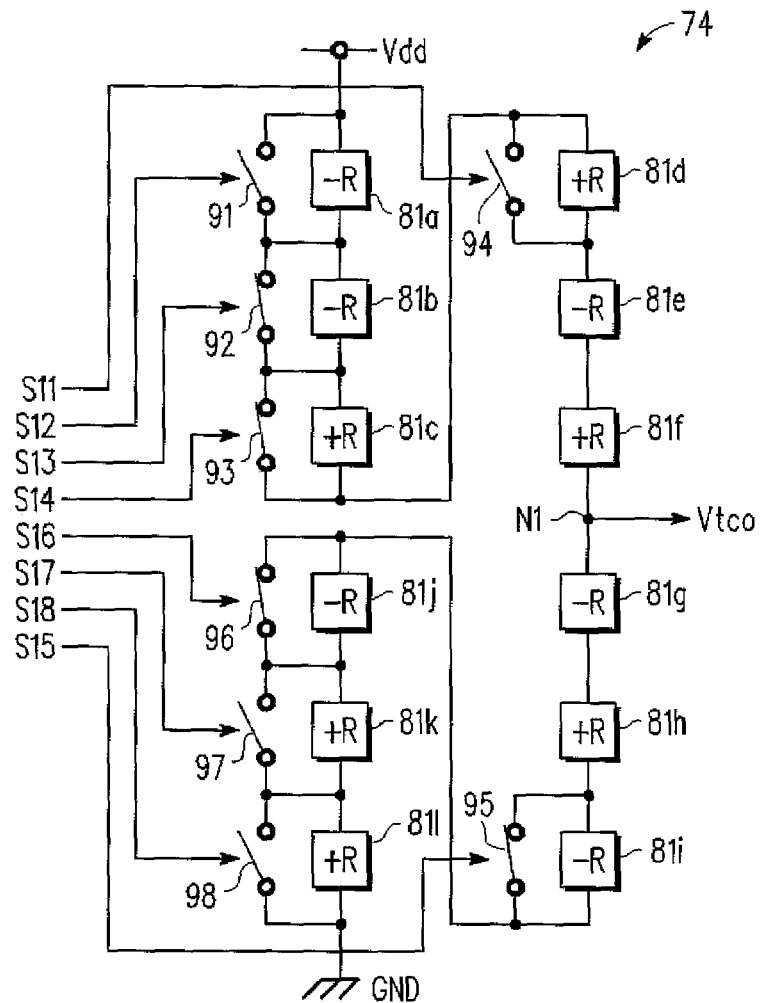
FIG. 3B is a schematic circuit diagram of a register in the TCO circuit of the sensor unit of FIG. 2.

The specific structure of the TCO circuit 12 will now be described with reference to FIGS. 3A and 3B. FIG. 3A is a schematic block diagram of a decoder 72 (control circuit) incorporated in the TCO circuit 12. FIG. 3B is a schematic circuit of a register 74 incorporated in the TCO circuit 12.

Referring to FIG. 3A, the decoder 72 is provided with the trimming signals Tx, Ty, and Tz for setting the temperature coefficient values TCx, TCy, and TCz. The decoder 72 is further provided with the clock signals CKx, CKy, and CKz for sequentially generating the temperature coefficient values TCx, TCy, and TCz set based on the trimming signals Tx, Ty, and Tz. The decoder 72 generates reset signals s1, s3, and s4 (pulses φ1, φ3, and φ5), sampling signals s2, s4, and s6 (pulses φ2, φ4, and φ6), and switch control signals s11 to s18 based on the trimming signals Tx, Ty, and Tz and the clock signals CKx, CKy, and CKz.

In detail, the decoder 72 causes the reset signal s5 (φ5) to fall and the sampling signal s6 (φ6) to rise at timing t1 in response to the rise of the clock signal CKx and the fall of the clock signal CKz as shown in FIG. 4. The decoder 72 then generates the sixth pulse φ6 having a pulse width corresponding to the third sample phase SP3 and causes the reset signal s1 (φ1) to rise at timing t2.

At timing t3, the decoder 72 causes the reset signal s1 (φ1) to fall and the sampling signal s2 (φ2) to rise in response to the fall of the clock signal CKx and the rise of the clock signal CKy. The pulse width of the reset signal s1 (φ1) corresponds to the first reset phase RP1. Subsequently, the decoder 72 generates the second pulse φ2 having a pulse width corresponding to the first sample phase SP1 and causes the reset signal s3 (φ3) to rise at timing t4.

At timing t5, the decoder 72 causes the reset signal s3 (φ3) to fall and the sampling signal s4 (φ4) to rise in response to the fall of the clock signal CKy and the rise of the clock signal CKz. The pulse width of the reset signal s3 (φ3) corresponds to the second reset phase RP2. Subsequently, the decoder 72 generates the fourth pulse o4 having a pulse width corresponding to the second sample phase SP2 and causes the reset signal s5 (φ5) to rise at timing t6.

At timing t7, the decoder 72 causes the reset signal s5 (φ5) to fall and the sampling signal s6 (φ6) to rise in response to the fall of the clock signal CKz and the rise of the clock signal CKx. The pulse width of the reset signal s5 (φ5) corresponds to the third reset phase RP3. Subsequently, the decoder 72 generates the sixth pulse φ6 having a pulse width corresponding to the third sample phase SP3 and causes the reset signal s1 (φ1) to rise at timing t8. As described above, the decoder 72 controls the reset signals s1, s3, and s5 and the sampling signals s2, s4, and s6 based on the logic state of each of the clock signals CKx, CKy, and CKz.

Further, the decoder 72 decodes the trimming signal Tx when the clock signal CKx has a high (H) level (during the period of timing t1 to t3) and provides the switch control signals s11 to s18 indicating the decoding result to the register 74. In the same manner, the decoder 72 provides the switch control signals s11 to s18 indicating the decoding result of the trimming signal Ty to the register 74 when the clock signal CKy has an H level (during the period of timing t3 to t5) and provides the switch control signals s11 to s18 indicating the decoding result of the trimming signal Tz to the register 74 when the clock signal CKz has an H level (during the period of timing t5 to t7).

As shown in FIG. 3B, the register 74 includes resistor circuits 81a to 81l and switches 91 to 98. The resistor circuits 81a to 81l are connected in series between a power supply Vdd and ground GND. It is preferred that each of the resistor circuits 81c, 81d, 81f, 81h, 81k, and 81l has a positive resistance property (indicated as "+R" in the drawing) and each of the resistor circuits 81a, 81b, 81e, 81g, 81i, and 81j and has a negative resistance property (indicated as "−R" in the drawing). In the resistor circuits having a positive resistance property, the resistance increases as temperature increases. In the resistor circuits having a negative resistance property, the resistance decreases as temperature increases.

The switches 91 to 98 are respectively connected in parallel to the resistor circuits 81a, 81b, 81c, 81d, 81i, 81j, 81k, and 81l. A connecting point between the resistor circuits 8 if and Big is defined as an output node N1 from which the correction signal Vtco is output. The switches 91 to 98 are turned on and off in response to the switch control signals s11 to s18 (decoding results) provided from the decoder 72 (FIG. 3A). Accordingly, the register 74 changes the number of resistor circuits (Positive resistor circuits and negative resistor circuits) connected between the power supply Vdd and the ground GND based on the on and off states of the switches 91 to 98. This changes the voltage level of the correction signal Vtco output from the TCO circuit 12 (i.e., the node N1). Thus, the temperature coefficient values TCx, TCy, and TCz can be generated sequentially.

The operation of the sensor unit 10 will now be described with reference to FIGS. 4 to 13.

Figure 5:
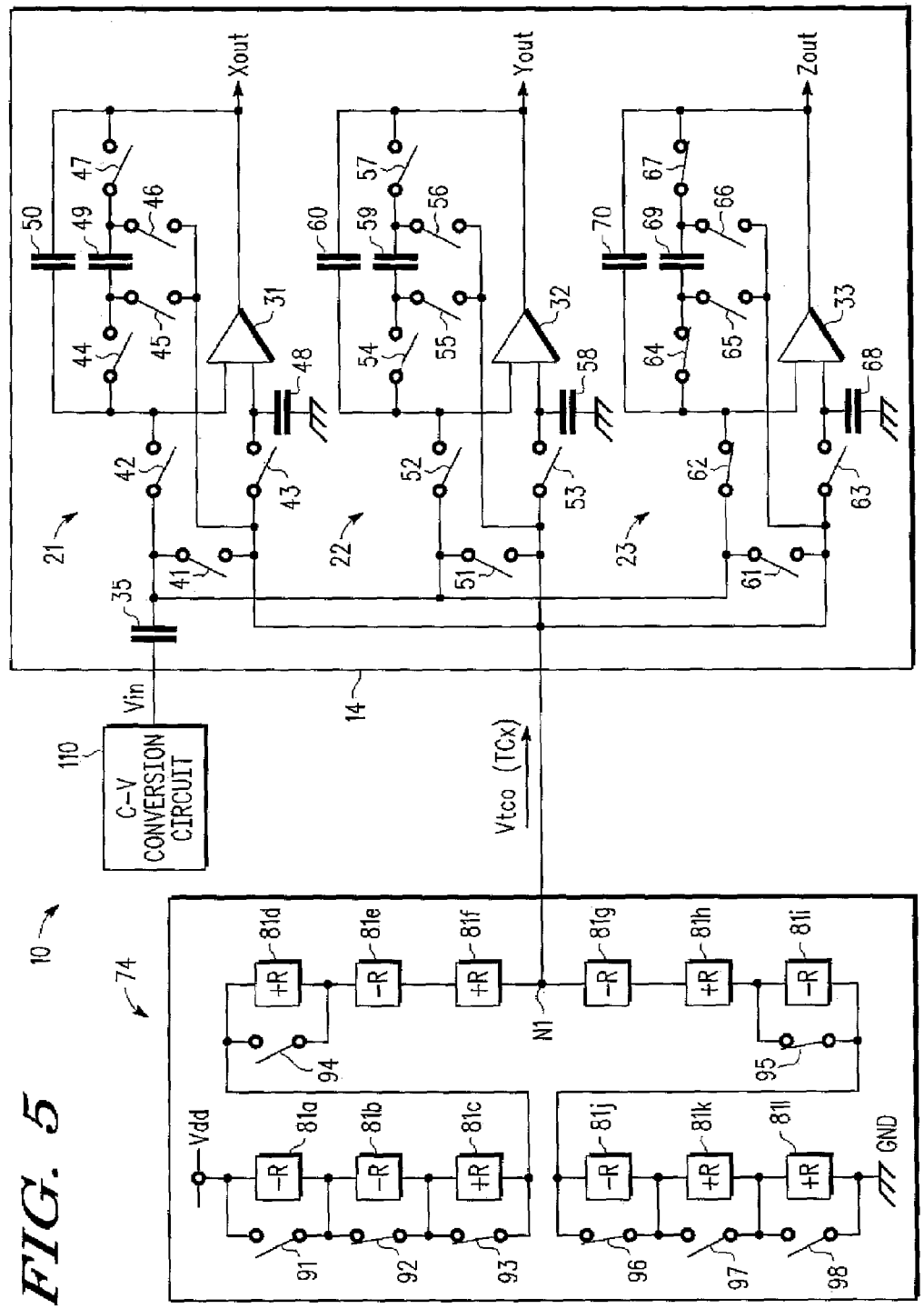
FIG. 5 is a schematic circuit diagram of the sensor unit of FIG. 2 switched to a state in which the sensor unit reads the acceleration in the Z-axis direction.
Figure 6:
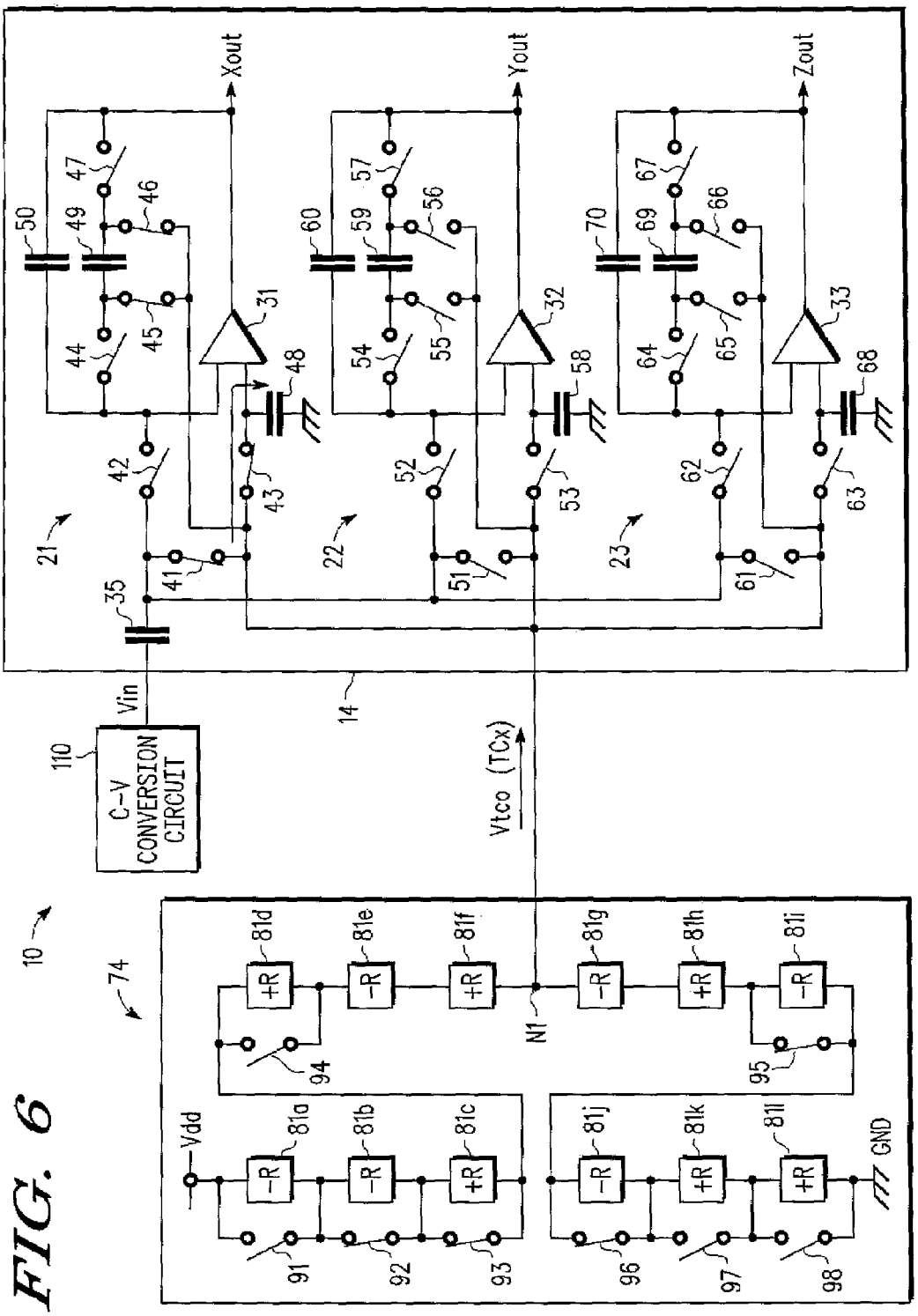
FIG. 6 is a schematic circuit diagram of the sensor unit of FIG. 2 switched to a state in which the sensor unit reads a temperature coefficient value for correcting the acceleration in the X-axis direction.

FIG. 5 is a circuit diagram showing the switching state of the sensor unit 10 during the third sample phase SP3 (e.g., the period of timing t1 to t2 in FIG. 4). FIG. 6 is a circuit diagram showing the switching state of the sensor unit 10 during the first reset phase RP1 (e.g., the period of timing t2 to t3 in FIG. 4).

Figure 11:
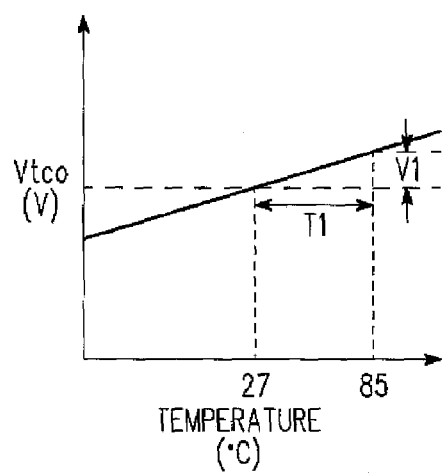
FIG. 11 is a graph showing the temperature characteristics of a correction signal generated by a resistor in the switching state shown in FIG. 6.

As shown in FIGS. 5 and 6, the register 74 turns on the switches 92, 93, 95, and 96 and turns off the switches 91, 94, 97, and 98 in response to the switch control signals s11 to s18 (decoding results of the trimming signal Tx) from the decoder 72 during both the third sample phase SP3 and the first reset phase RP1. The register 74 then generates the correction signal Vtco for providing the correction coefficient value TCx based on the resistance of each of the resistor circuits 81a, 81d to 81h, 81k, and 81l. The correction signal Vtco has a first temperature property indicated by a straight line having a gradient of V1/T1 (in which V1 and T1 are both greater than 0), as shown in FIG. 11. Thus, the register 74 (i.e., the TCO circuit 12) can generate the correction coefficient value TCx in correspondence with any temperature.

The correction coefficient value TCx generated by the TCO circuit 12 is held by the input capacitor 48 of the first SC circuit 21 during the first reset phase RP1 (FIG. 6). During the first reset phase RP1, the input capacitor 35 further holds the acceleration value Ax (FIG. 1B) in the X-axis direction provided from the C-V conversion circuit 110.

Figure 7:
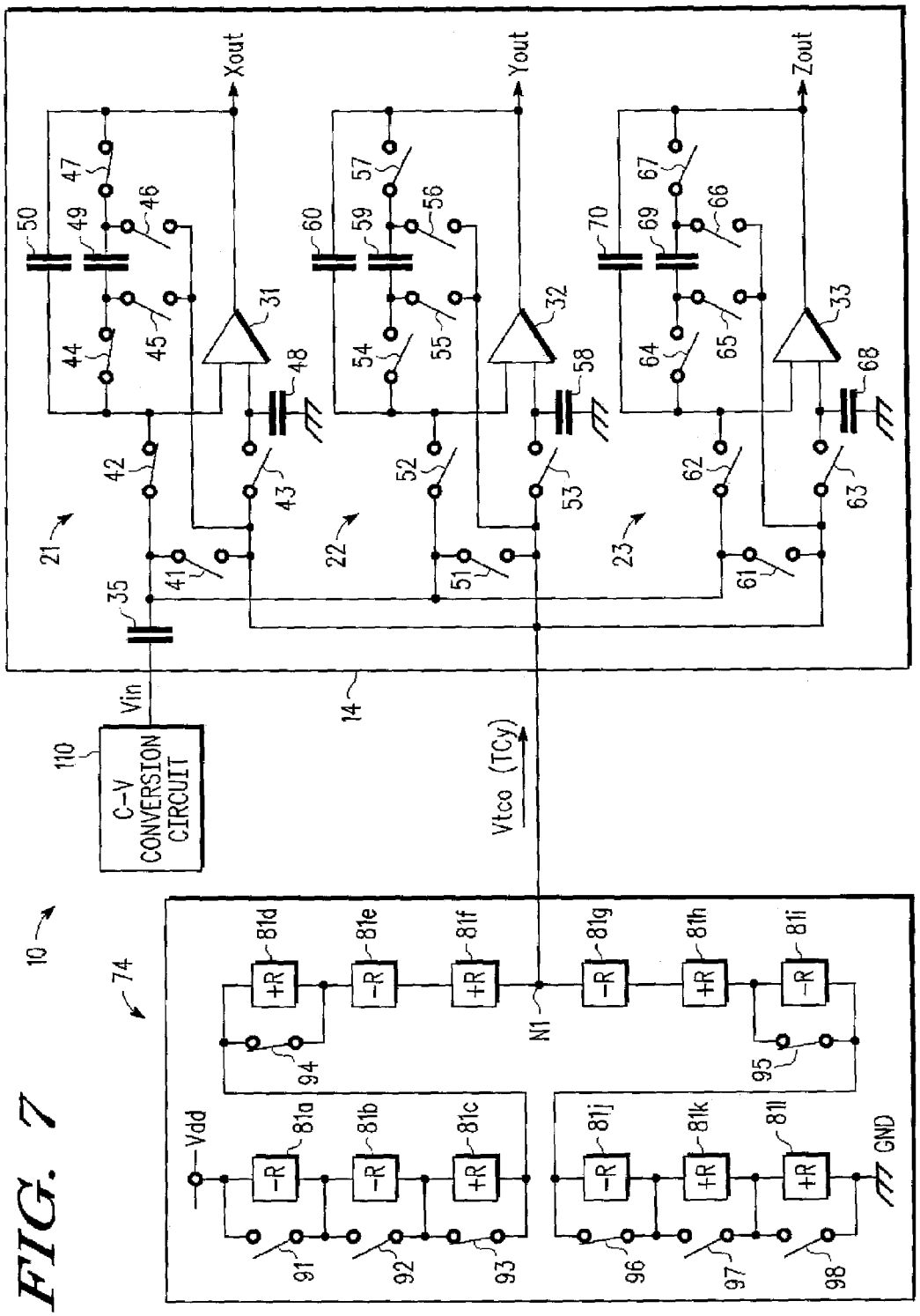
FIG. 7 is a schematic circuit diagram of the sensor unit of FIG. 2 switched to a state in which the sensor unit reads the acceleration in the X-axis direction.
Figure 8:
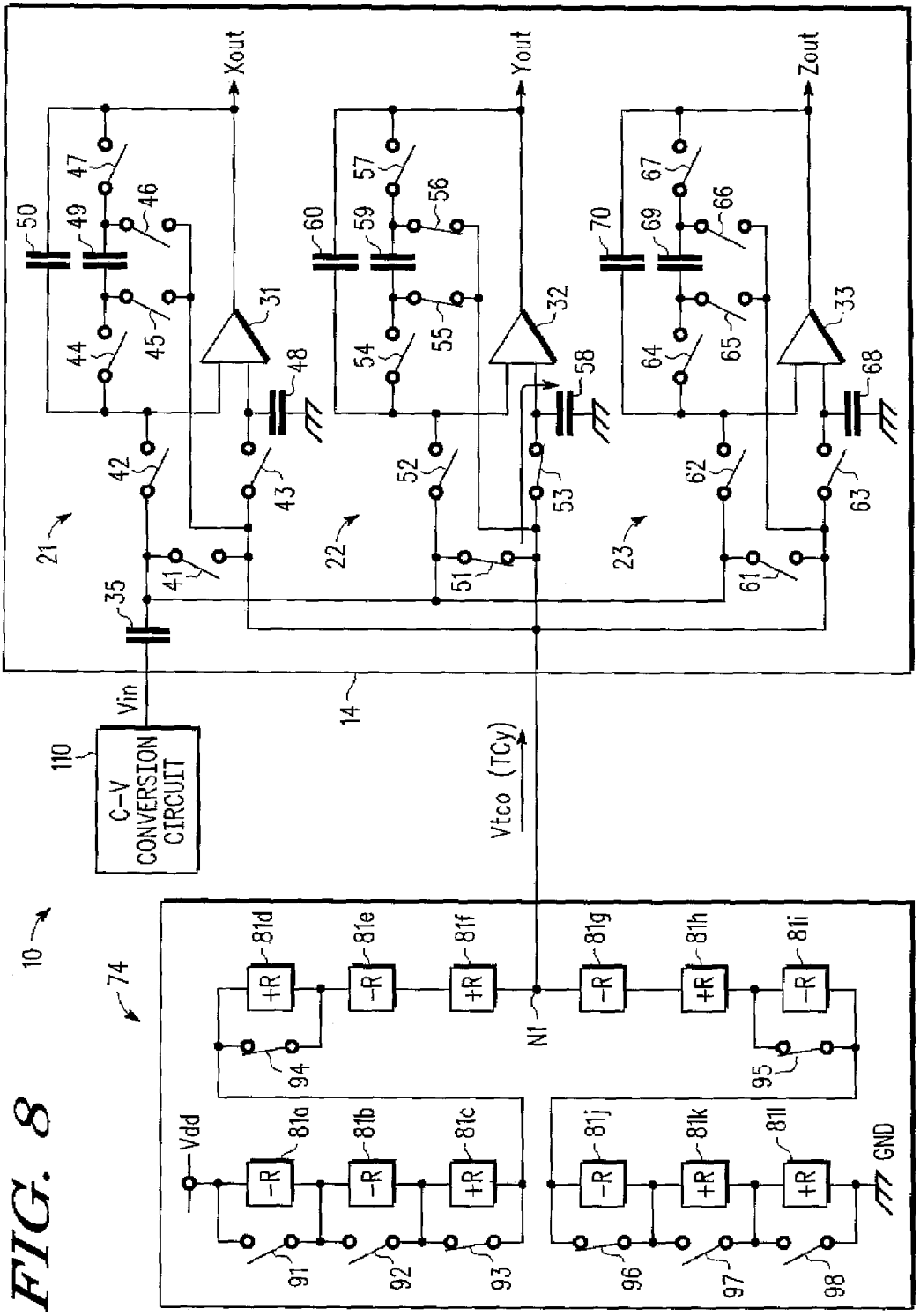
FIG. 8 is a schematic circuit diagram of the sensor unit of FIG. 2 switched to a state in which the sensor unit reads a temperature coefficient value for correcting the acceleration in the Y-axis direction.

FIG. 7 is a circuit diagram showing the switching state of the sensor unit 10 during the first sample phase SP1 (e.g., the period of timing t3 to t4 in FIG. 4). FIG. 8 is a circuit diagram showing the switching state of the sensor unit 10 in the second reset phase RP2 (e.g., the period of timing t4 to t5 in FIG. 4).

Figure 12:
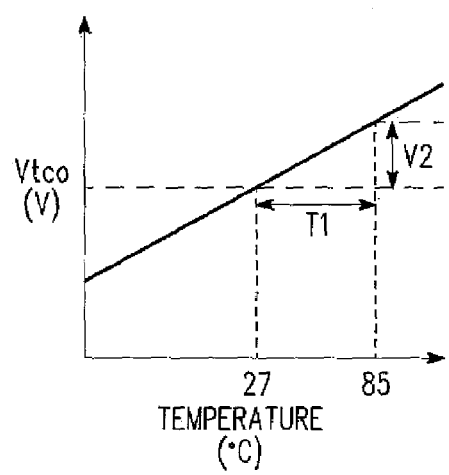
FIG. 12 is a graph showing the temperature characteristic of a correction signal generated by the register in the switched state shown in FIG. 8.

As shown in FIGS. 7 and 8, the register 74 turns on the switches 93 to 96 and turns off the switches 91, 92, 97, and 98 in response to the switch control signals s11 to s18 (decoding results of the trimming signal Ty) from the decoder 72 during both the first sample phase SP1 and the second reset phase RP2. The register 74 then generates the correction signal Vtco for providing the correction coefficient value TCy based on the resistance of each of the resistor circuits 81a, 81b, 81e to 81h, 81k, and 81l. The correction signal Vtco has a second temperature characteristic indicated by a straight line having a gradient of V2/T1 (in which V2 is greater than V1), as shown in FIG. 12. Thus, the register 74 (i.e., the TCO circuit 12) can generate the correction coefficient value TCy in correspondence with any temperature.

As described above, the acceleration value Ax and the correction coefficient value TCx held by the input capacitors 35 and 48 are read by the first operational amplifier 31 during the first sample phase SP1 (FIG. 7). The first operational amplifier 31 then performs the correction and amplification processing to generate an acceleration signal Xout for the X-axis direction. The first operational amplifier 31 holds the acceleration signal Xout throughout the first hold phase HP1 (refer to FIG. 4).

The correction coefficient value TCy generated by the TCO circuit 12 is held by the input capacitor 58 of the second SC circuit 22 during the second reset phase RP2 (FIG. 8) that starts simultaneously with the first hold phase HP1. As described above, the acceleration value Ay (FIG. 1B) for the Y-axis direction provided from the C-V conversion circuit 110 is held by the input capacitor 35 during the second reset phase RP2.

Figure 9:
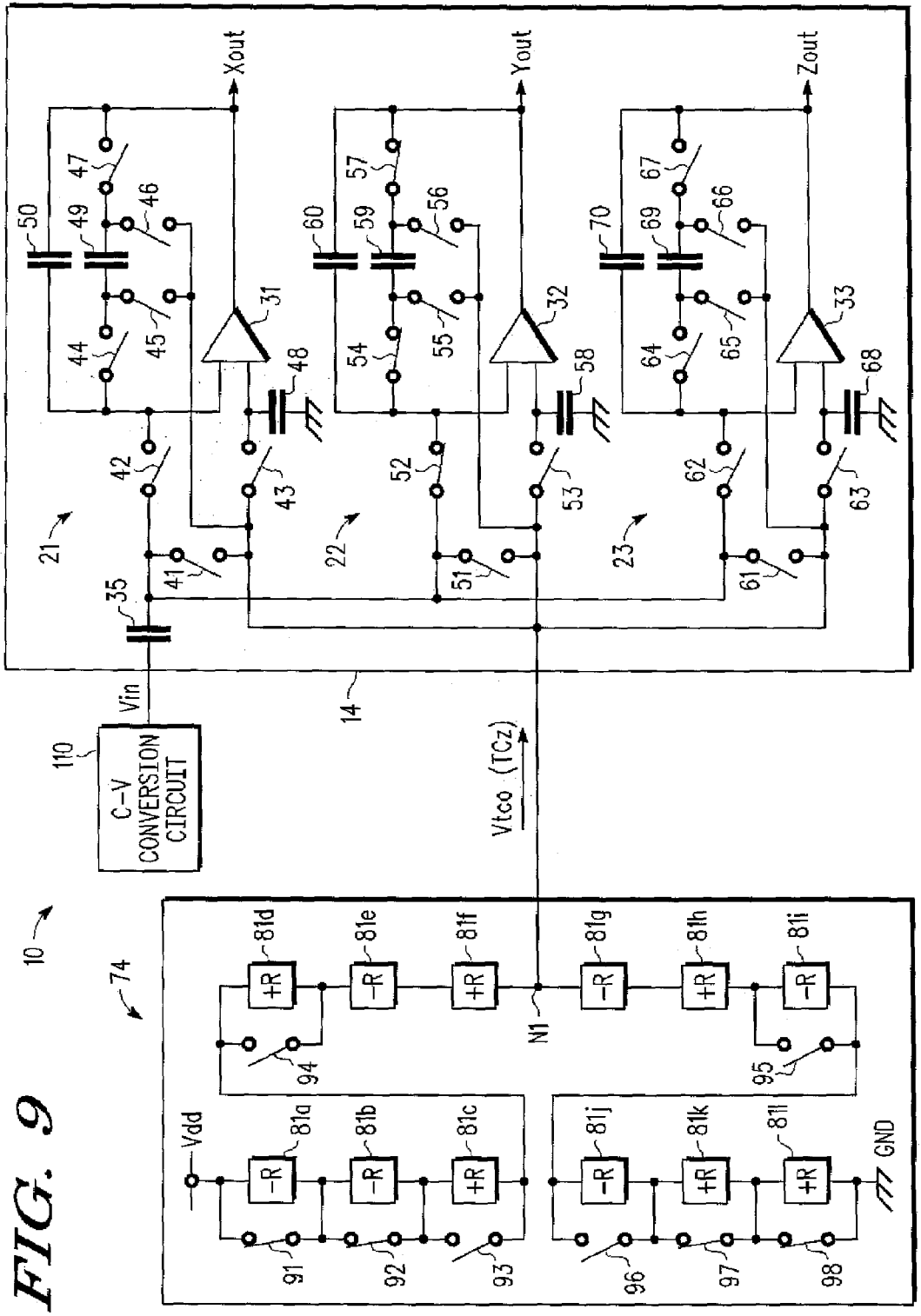
FIG. 9 is a schematic circuit diagram of the sensor unit of FIG. 2 switched to a state in which the sensor unit reads the acceleration in the Y-axis direction.
Figure 10:
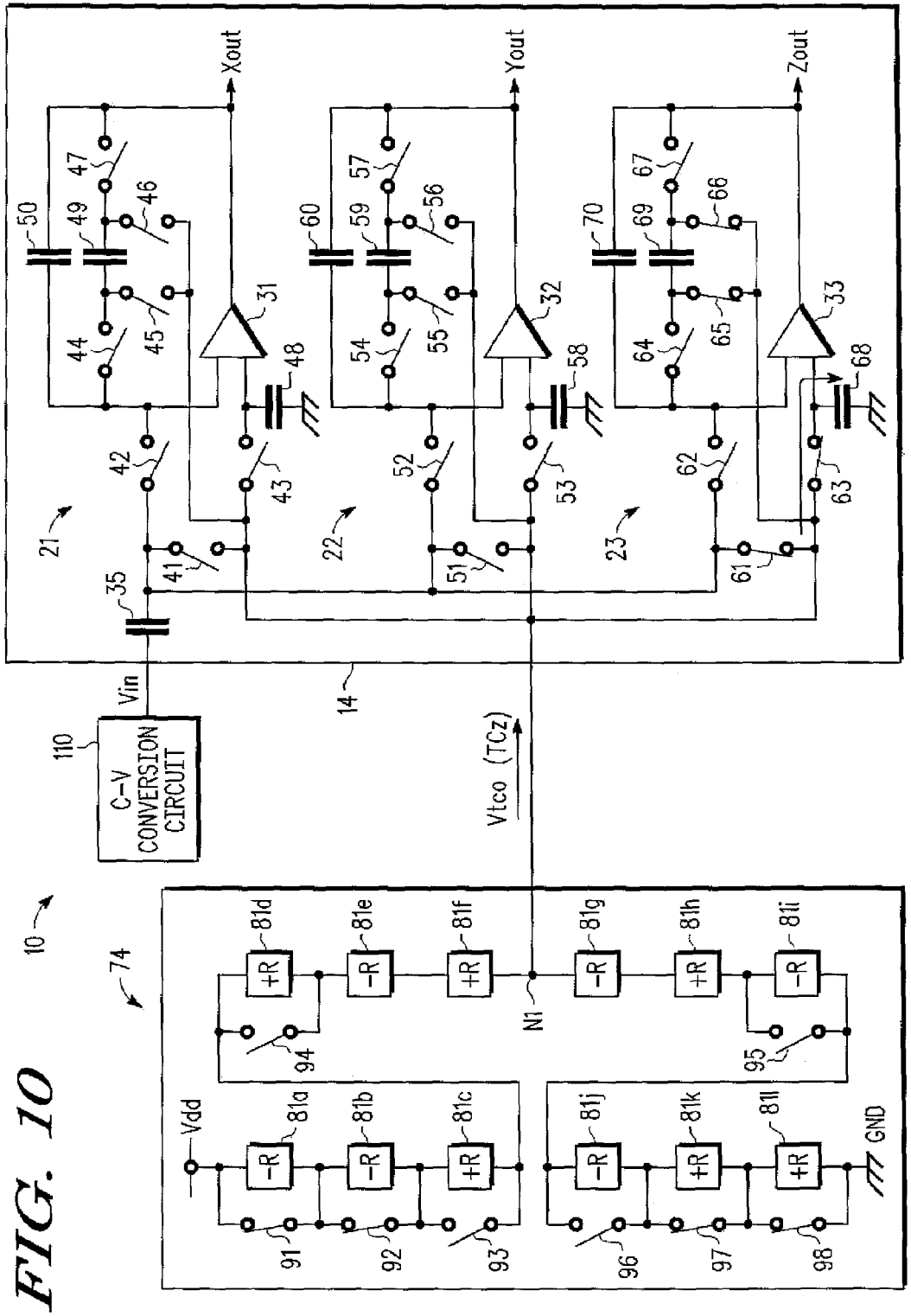
FIG. 10 is a schematic circuit diagram of the sensor unit of FIG. 2 switched to a state in which the sensor unit reads a temperature coefficient value for correcting the acceleration in the Z-axis direction.

FIG. 9 is a circuit diagram showing the switching state of the sensor unit 10 during the second sample phase SP2 (e.g., during the period of timing t5 to t6 in FIG. 4). FIG. 10 is a circuit diagram showing the switching state of the sensor unit 10 during the third reset phase RP3 (e.g., during the period of timing t6 to t7 in FIG. 4).

Figure 13:
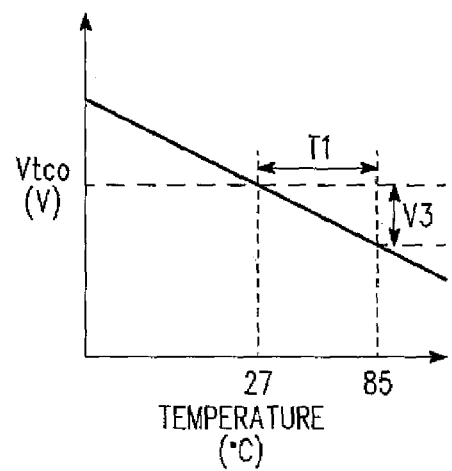
FIG. 13 is a graph showing the temperature characteristics of a correction signal generated by the register in the switched state shown in FIG. 10.

As shown in FIGS. 9 and 10, the register 74 turns on the switches 91, 92, 97, and 98 and turns off the switches 93 to 96 in response to the switch control signals s11 to s18 (decoding results of the trimming signal Tz) from the decoder 72 during both the second sample phase SP2 and the third reset phase RP3. The register 74 then generates the correction signal Vtco for providing the correction coefficient value TCz based on the resistance of each of the resistor circuits 81c to 81j. The correction signal Vtco has a third temperature characteristic indicated by a straight line having a gradient of −V3/T1 (in which V3 is greater than 0), as shown in FIG. 13. Thus, the register 74 (i.e., the TCO circuit 12) can generate the correction coefficient value TCz in correspondence with any temperature.

As described above, the acceleration value Ay and the correction coefficient value TCy held by the input capacitors 35 and 58 are read by the second operational amplifier 32 during the second sample phase SP2 (FIG. 9). The second operational amplifier 32 then performs the correction and amplification processing to generate an acceleration signal Yout for the Y-axis direction. The second operational amplifier 32 holds the acceleration signal Yout throughout the second hold phase HP2 (refer to FIG. 4).

The correction coefficient value TCz generated by the TCO circuit 12 is held by the input capacitor 68 of the third SC circuit 23 during the third reset phase RP3 (FIG. 10) that starts simultaneously with the second hold phase HP2. As described above, the acceleration value Az (FIG. 1B) for the Z-axis direction provided from the C-V conversion circuit 110 is held by the input capacitor 35 during the third reset phase RP3.

The acceleration value Az and the correction coefficient value TCz held by the input capacitors 35 and 68 are read by the third operational amplifier 33 during the third sample phase SP3 (FIG. 5). The third operational amplifier 33 then performs the correction and amplification processing to generate an acceleration signal Zout for the Z-axis direction. The third operational amplifier 33 holds the acceleration signal Zout throughout the third hold phase HP3 (refer to FIG. 4).

In this manner, the output circuit 14 of the sensor unit 10 reads the correction coefficient values TCx, TCy, and TCz generated sequentially by the TCO circuit 12 using the first to third SC circuits 21 to 23 during the corresponding reset phase periods. The output circuit 14 then corrects the acceleration values Ax, Ay, and Az for the X-axis, Y-axis, and Z-axis directions with the first to third operational amplifiers 31 to 33 during the corresponding sample phase periods and holds the corrected signals (acceleration signals Xout, Yout, and Zout) during the corresponding hold phases. Accordingly, in the present invention, the sensor unit 10 requires only one TCO circuit.

The features of the clock timing with the TCO circuit 12 will now be described in detail with reference to FIG. 14. The clock signal CKx will be used as an example.

Figure 14:
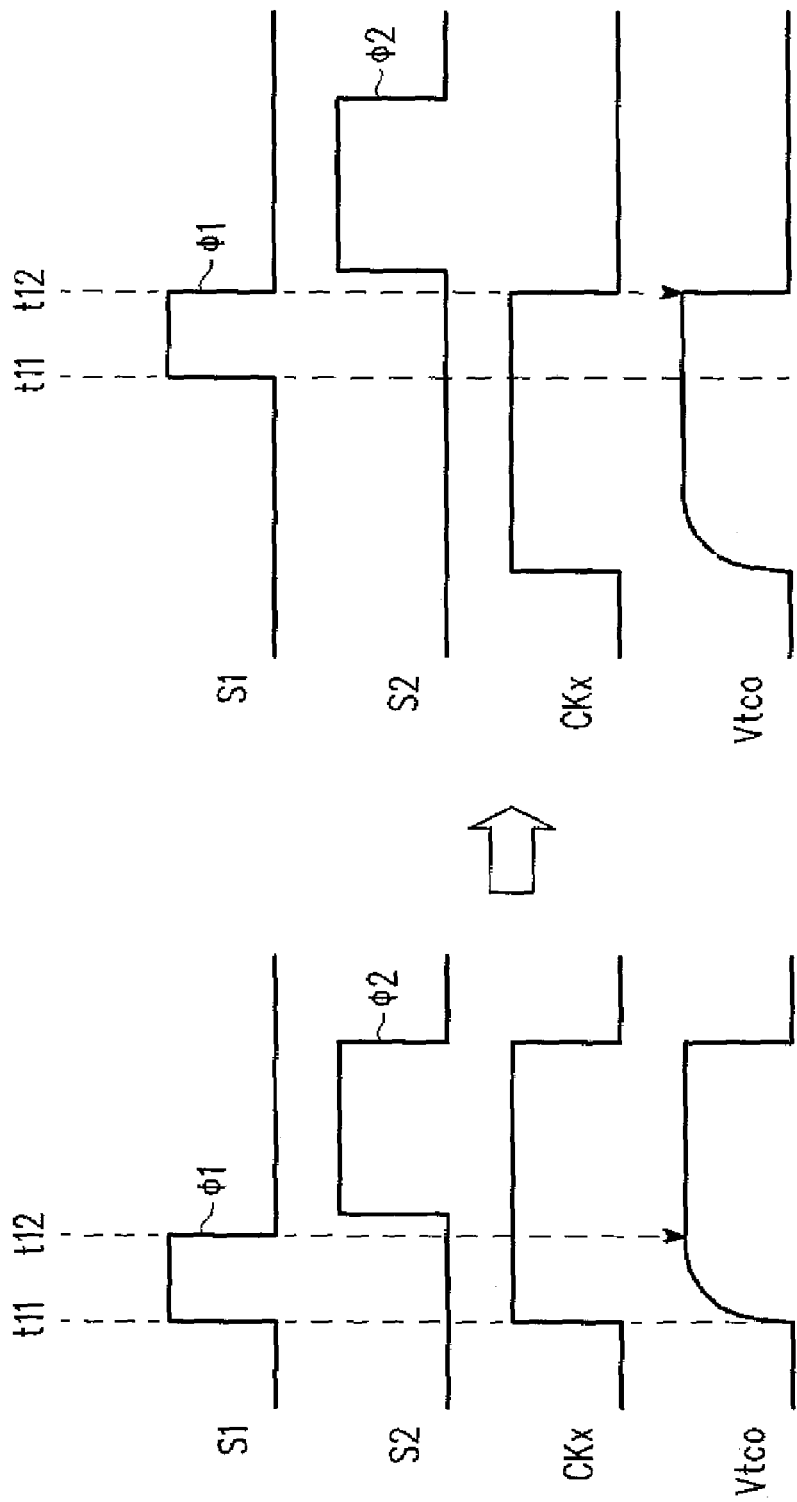
FIG. 14 is another view of the waveform diagram of FIG. 4.

For the clock timing shown in the left portion of FIG. 14, the TCO circuit 12 causes the reset signal s1 (pulse φ1) to rise in synchronization with the rising of the clock signal CKx (timing t11). Subsequently, the TCO circuit 12 causes the sampling signal s2 (pulse φ2) to rise a few nanoseconds after the reset signal s1 falls (timing t12), and causes the sampling signal s2 to fall in synchronization with the falling of the clock signal CKx. As described above, the TCO circuit 12 generates the correction signal Vtco (the correction coefficient value TCx in this case) while the clock signal CKx has an H level. However, parasitic capacitance may slow the rising of the correction signal Vtco as shown in FIG. 14. In this case, the level of the correction signal Vtco may be unstable when it is read during the reset phase RP1. As a result, the input capacitor 48 may not be sufficiently charged.

Accordingly, the clock timing is set as shown in the right portion of FIG. 14 (enlarged view of FIG. 4) in the preferred embodiment. More specifically, the TCO circuit 12 causes the reset signal s1 (pulse φ1) to rise when the level of the clock signal CKx is stable (H level state, timing t11). The TCO circuit 12 then causes the reset signal s1 to fall in synchronization with the fall of the clock signal CKx (timing t12). This enables the correction signal Vtco that has a stable level to be read during the reset phase RP1. As a result, the input capacitor 48 is sufficiently charged.

The sensor unit 10 of the preferred embodiment has the advantages described below.

The TCO circuit 12 sequentially generates the correction coefficient values TCx, TCy, and TCz that correct the acceleration values Ax, Ay, and Az for the X-axis, Y-axis, and Z-axis directions. The output circuit 14 includes the first to third SC circuits 21 to 23 and the first to third operational amplifiers 31 to 33. The first SC circuit 21 holds the correction coefficient value TCx in response to the first pulse φ1 (first reset signal s1) of the TCO circuit 12 when the input capacitor 35 holds the acceleration value Ax. The first SC circuit 21 provides the acceleration value Ax and the correction coefficient value TCx to the first operational amplifier 31 in response to the second pulse φ2 (the first sampling signal s2) of the TCO circuit 12. The second SC circuit 22 holds the correction coefficient value TCy in response to the third pulse φ3 (the second reset signal s3) of the TCO circuit 12 when the input capacitor 35 holds the acceleration value Ay. The second SC circuit 22 provides the acceleration value Ay and the correction coefficient value TCy to the second operational amplifier 32 in response to the fourth pulse φ4 (the second sampling signal s2) of the TCO circuit 12. The third SC circuit 23 holds the correction coefficient value TCy in response to the fifth pulse φ5 (the third reset signal s5) of the TCO circuit 12 when the input capacitor 35 holds the acceleration value Az. The third SC circuit 23 provides the acceleration value Az and the correction coefficient value TCz to the third operational amplifier 33 in response to the sixth pulse φ6 (the third sampling signal s6) of the TCO circuit 12. Accordingly, the sensor unit 10 corrects the output (the acceleration values Ax, Ay, and Az) of the three-axis accelerometer 1 with the single TCO circuit 12.

The first to third SC circuits 21 to 23 read the correction coefficient values TCx, TCy, and TCz when these values have a stable level (refer to FIG. 14). This corrects the acceleration values Ax, Ay, and Az with high accuracy.

It should be apparent to those skilled in the art that the present invention may be embodied in many other specific forms without departing from the spirit or scope of the invention. Particularly, it should be understood that the present invention may be embodied in the following forms.

The sensor unit of the present invention is not limited to a three-axis accelerometer and may be, for example, a two-axis accelerometer. In this case, the sensor unit includes two switched capacitor circuits and two operational amplifiers.

The number of the resistor circuits (the positive resistor circuits and the negative resistor circuits) and the number of the switches included in the register 74 may be changed as required.

The present examples and embodiments are to be considered as illustrative and not restrictive, and the invention is not to be limited to the details given herein, but may be modified within the scope and equivalence of the appended claims.

What is claimed is:

1. A sensor unit with a temperature compensation circuit for connection to an accelerometer in which the accelerometer detects a plurality of acceleration values respectively for a plurality of axis directions, wherein the plurality of acceleration values have a temperature dependency, the sensor unit comprising:
   an input capacitor, connected to the accelerometer, for sequentially holding the plurality of acceleration values;
   a correction value generation circuit that sequentially generates a plurality of correction values for respectively correcting the plurality of acceleration values, wherein each of the plurality of correction values is a temperature coefficient value for correcting the temperature dependency; and
   a correction circuit connected to the correction value generation circuit, wherein the correction circuit receives the plurality of correction values from the correction value generation circuit and sequentially corrects the plurality of acceleration values with the plurality of correction values to generate a plurality of corrected acceleration values, and wherein the correction circuit includes:
      a plurality of switched capacitor circuits, connected to the input capacitor and the correction value generation circuit, for respectively holding the plurality of correction values; and
      a plurality of operational amplifiers connected to the plurality of switched capacitor circuits respectively, wherein the operational amplifiers each receive one of the plurality of acceleration values from the input capacitor via a corresponding one of the plurality of switched capacitor circuits to correct the received acceleration value with the correction value held by the corresponding switched capacitor circuit.

2. The sensor unit according to claim 1, wherein the correction value generation circuit sequentially generates the plurality of correction values in accordance with a plurality of clock signals.

3. The sensor unit according to claim 1, wherein:
   the accelerometer detects first, second, and third acceleration values respectively for X-axis, Y-axis, and Z-axis directions;
   the correction value generation circuit generates first, second, and third correction values for respectively correcting the first, second, and third acceleration values; and
   wherein the plurality of switched capacitor circuits and operational amplifiers of the correction circuit includes:
      a first switched capacitor circuit, connected to the accelerometer and the correction value generation circuit, for holding the first correction value;
      a first operational amplifier, connected to the first switched capacitor circuit, for receiving the first acceleration value and the first correction value via the first switched capacitor circuit and generating a first corrected acceleration value;

a second switched capacitor circuit, connected to the accelerometer and the correction value generation circuit, for holding the second correction value;

a second operational amplifier, connected to the second switched capacitor circuit, for receiving the second acceleration value and the second correction value via the second switched capacitor circuit and generating a second corrected acceleration value;

a third switched capacitor circuit, connected to the accelerometer and the correction value generation circuit, for holding the third correction value; and a third operational amplifier, connected to the third switched capacitor circuit, for receiving the third acceleration value and the third correction value via the third switched capacitor circuit and generating a third corrected acceleration value.

4. The sensor unit according to claim 3, wherein the input capacitor is connected between the accelerometer and the first, second, and third switched capacitor circuits, for sequentially holding the first, second, and third acceleration values, wherein:

the first switched capacitor circuit holds the first correction value when the input capacitor holds the first acceleration value;

the second switched capacitor circuit holds the second correction value when the input capacitor holds the second acceleration value; and the third switched capacitor circuit holds the third correction value when the input capacitor holds the third acceleration value.

5. The sensor unit according to claim 4, wherein the correction value generation circuit:

sequentially generates the first, second, and third correction values in accordance with first, second, and third clock signals;

generates a first sampling signal in synchronization with inactivation of the first clock signal and activation of the second clock signal, the first sampling signal being used by the first operational amplifier to read the first correction value and the first acceleration value;

generates a second sampling signal in synchronization with inactivation of the second clock signal and activation of the third clock signal, the second sampling signal being used by the second operational amplifier to read the second correction value and the second acceleration value;

generates a third sampling signal in synchronization with inactivation of the third clock signal and activation of the first clock signal, the third sampling signal being used by the third operational amplifier to read the third correction value and the third acceleration value;

generates a first reset signal following the third sampling signal to hold the first correction value with the first switched capacitor circuit;

generates a second reset signal following the first sampling signal to hold the second correction value with the second switched capacitor circuit; and generates a third reset signal following the second sampling signal to hold the third correction value with the third switched capacitor circuit.

6. The sensor unit according to claim 3, wherein the correction value generation circuit includes:

a plurality of series-connected resistor circuits including an output node for sequentially outputting the first, second, and third correction values;

at least two switches connected in parallel to at least two of the plurality of resistor circuits; and a control circuit for controlling the at least two switches and sequentially generating the first, second, and third correction values at the output node.

7. The sensor unit according to claim 6, wherein the plurality of resistor circuits include a first resistor circuit having a positive resistance property and a second resistor circuit having a negative resistance property.

8. A sensor unit with a temperature compensation circuit for connection to an accelerometer in which the accelerometer detects a plurality of acceleration values respectively for a plurality of axis directions, wherein the plurality of acceleration values have a temperature dependency, the sensor unit comprising:

a temperature coefficient offset (TCO) circuit for generating temperature coefficient values used to adjust the acceleration values in order to compensate said temperature dependency;

a C-V conversion circuit connected to the accelerometer and receiving capacitance values indicative of the acceleration values, and converting the capacitance values to corresponding voltage values;

an output circuit connected to the TCO circuit and the C-V circuit, the output circuit including, an input capacitor connected to the C-V circuit for sequentially holding the plurality of acceleration values;

a plurality of switched capacitor circuits, connected to the input capacitor TOC circuit for respectively holding the plurality of temperature coefficient values; and a plurality of operational amplifiers connected to the plurality of switched capacitor circuits respectively, wherein the operational amplifiers each receive one of the plurality of acceleration values from the input capacitor via a corresponding one of the plurality of switched capacitor circuits and combine the received acceleration value with the temperature coefficient value held by the corresponding switched capacitor circuit.

* * * * *